United States Patent
Miura et al.

(10) Patent No.: US 12,403,911 B2
(45) Date of Patent: Sep. 2, 2025

(54) CONTROL DEVICE, CONTROL METHOD, AND STORAGE MEDIUM

(71) Applicant: HONDA MOTOR CO., LTD., Tokyo (JP)

(72) Inventors: Aya Miura, Wako (JP); Kenji Komori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 141 days.

(21) Appl. No.: 18/119,853

(22) Filed: Mar. 10, 2023

(65) Prior Publication Data
US 2023/0294702 A1    Sep. 21, 2023

(30) Foreign Application Priority Data

Mar. 17, 2022    (JP) ................ 2022-042161

(51) Int. Cl.
| | |
|---|---|
| B60W 10/04 | (2006.01) |
| B60W 10/18 | (2012.01) |
| B60W 10/20 | (2006.01) |
| B60W 30/18 | (2012.01) |
| B60W 40/04 | (2006.01) |
| B60W 40/105 | (2012.01) |
| B60W 60/00 | (2020.01) |

(52) U.S. Cl.
CPC ..... *B60W 30/18163* (2013.01); *B60W 60/001* (2020.02); *B60W 2554/4041* (2020.02)

(58) Field of Classification Search
CPC ......... B60W 30/18163; B60W 60/001; B60W 2554/4041; B60W 2554/4042; B60W 2554/4044; B60W 2554/4045; B60W 2554/801; B60W 2554/802; B60W 10/04; B60W 10/18; B60W 10/20; B60W 40/04; B60W 40/105; B60W 2520/10
USPC ........................................................... 701/23
See application file for complete search history.

(56) References Cited

U.S. PATENT DOCUMENTS

| | | | |
|---|---|---|---|
| 2018/0001894 A1* | 1/2018 | Masui | B60W 10/18 |
| 2020/0307637 A1 | 10/2020 | Oguro et al. | |
| 2022/0009520 A1* | 1/2022 | Lindholm | B60W 60/0025 |
| 2022/0234583 A1* | 7/2022 | Kang | G06V 20/588 |

(Continued)

FOREIGN PATENT DOCUMENTS

| | | |
|---|---|---|
| JP | 2016-134093 | 7/2016 |
| JP | 2020-003971 | 1/2020 |
| JP | 2020-158077 | 10/2020 |

OTHER PUBLICATIONS

Japanese Office Action for Japanese Patent Application No. 2022-042161 dated Jul. 15, 2025.

*Primary Examiner* — Rachid Bendidi
*Assistant Examiner* — Hossam M Abd El Latif
(74) *Attorney, Agent, or Firm* — Amin, Turocy & Waton, LLP

(57) ABSTRACT

A control device acquires a speed of another vehicle and a position of the other vehicle, selects a determination scheme according to the speed of the other vehicle from among a plurality of determination schemes, applies the position of the other vehicle to the selected determination scheme to determine whether the other vehicle enters a second lane adjacent to a first lane in which the other vehicle travels from the first lane, and controls the vehicle based on a result of the determination.

11 Claims, 9 Drawing Sheets

(56) References Cited

U.S. PATENT DOCUMENTS

2023/0296764 A1\* 9/2023 Shin ............... G01S 13/726
2024/0174230 A1\* 5/2024 Saito ............... B60W 30/16

\* cited by examiner

CONTROL DEVICE, CONTROL METHOD, AND STORAGE MEDIUM

CROSS-REFERENCE TO RELATED APPLICATION

Priority is claimed on Japanese Patent Application No. 2022-042161, filed Mar. 17, 2022, the content of which is incorporated herein by reference.

FIELD

The present invention relates to a control device, a control method, and a storage medium.

BACKGROUND

In the related art, a travel control device that recognizes a white line as a traveling demarcation line for demarcating a traveling lane of a host vehicle on the basis of an image acquired by an imaging device, and determines a preceding vehicle traveling in an adjacent lane to be a cut-in vehicle cutting in a host lane on the basis of a relative position of the preceding vehicle in a vehicle width direction with reference to the white line has been disclosed (Japanese Unexamined Patent Application, First Publication No. 2016-134093).

SUMMARY

However, with the above technology, it is not possible to accurately determine an intended action of a vehicle in some cases.

The present invention has been made in consideration of such circumstances, and one object of the present invention is to provide a control device, a control method, and a storage medium capable of controlling a vehicle so that the vehicle performs a more appropriate action according to a surrounding situation by accurately determining or estimating an intended action of the vehicle.

The control device, control method, and storage medium according to the present invention employ the following configurations.

(1): A control device according to an aspect of the present invention, wherein the one or more processors acquire a speed of another vehicle and a position of the other vehicle, select a determination scheme according to the speed of the other vehicle from among a plurality of determination schemes, apply the position of the other vehicle to the selected determination scheme to determine whether the other vehicle enters a second lane adjacent to a first lane in which the other vehicle travels from the first lane, and control the vehicle based on a result of the determination.

(2): In the aspect of (1), the one or more processors select a first determination scheme from among the plurality of determination schemes when the speed of the other vehicle is lower than a threshold, and select a second determination scheme from among the plurality of determination schemes when the speed of the other vehicle is equal to or higher than the threshold, the first determination scheme includes a direction of the other vehicle with respect to the second lane as a determination criterion, and the second determination scheme does not include the direction of the other vehicle with respect to the second lane as a determination criterion.

(3): In the aspect of (1) or (2), wherein the one or more processors select a first determination scheme from among the plurality of determination schemes when the speed of the other vehicle is lower than a threshold and select a second determination scheme from among the plurality of determination schemes when the speed of the other vehicle is equal to or higher than the threshold. The first determination scheme includes a distance from a centroid of the other vehicle to a road demarcation line for demarcating the first lane and the second lane as a determination criterion, and the second determination scheme does not include the distance from the centroid of the other vehicle to the road demarcation line for demarcating the first lane and the second lane as the determination criterion.

(4): In the aspect of (2) or (3), the one or more processors determine that the other vehicle changes lanes to the second lane when a state in which the direction of the other vehicle with respect to the second lane has satisfied a criterion, and the distance from the centroid of the other vehicle to the road demarcation line for demarcating the first lane and the second lane has satisfied a criterion lasts a first time, in the first determination scheme and suppress lane change of the vehicle to the second lane.

(5): In the aspect of any one of (1) to (4), the one or more processors select a first determination scheme from among the plurality of determination schemes when the speed of the other vehicle is lower than a threshold and select a second determination scheme from among the plurality of determination schemes when the speed of the other vehicle is equal to or higher than the threshold. The first determination scheme does not include a distance from an end point of the other vehicle to a road demarcation line for demarcating the first lane and the second lane as a determination criterion, and the second determination scheme includes the distance from the end point of the other vehicle to the road demarcation line as a determination criterion.

(6): In the aspect of any one of (1) to (5), the one or more processors determine, in the second determination scheme, that the other vehicle changes lanes to the second lane when the tendency of change in the distance from the end point of the other vehicle to the road demarcation line in a predetermined period of time becomes shorter with the tendency being equal to or greater than a threshold, and the distance is equal to or smaller than a threshold and suppress lane change of the vehicle to the second lane.

(7): In the aspect of any one of (1) to (6), the one or more processors select a first determination scheme from among the plurality of determination schemes when the speed of the other vehicle is lower than a threshold, and select a second determination scheme from among the plurality of determination schemes when the speed of the other vehicle is equal to or higher than the threshold. The first determination scheme includes a direction of the other vehicle with respect to the second lane and a distance from a centroid of the other vehicle to a road demarcation line for demarcating the first lane and the second lane as determination criteria and does not include a distance from an end point of the other vehicle to the road demarcation line as a determination criterion, and the second determination scheme includes the distance from the end point of the other vehicle to the road demarcation line as a determination criterion and does not include the direction of the other vehicle with respect to the second lane and the distance from the centroid of the other vehicle to the road demarcation line for demarcating the first lane and the second lane as determination criteria.

(8): In the aspect of any one of (1) to (7), the one or more processors determine whether or not the other vehicle enters the second lane using a determination scheme according to the speed of the other vehicle when a road corresponding to the first lane and the second lane is not a curved road to a predetermined degree or more and does not determine whether or not the other vehicle enters the second lane using a determination scheme according to the speed of the other vehicle when a road corresponding to the first lane and the second lane is a curved road to a predetermined degree or more.

(9): In the aspect of any one of (1) to (8), the one or more processors cause the vehicle to change lanes to the second lane behind the other vehicle without considering a determination result of the determination scheme according to the speed of the other vehicle in a case in which the other vehicle is entering the second lane in front of a reference position of the vehicle when the vehicle is present in a third lane adjacent to the first lane and adjacent to the second lane, and the vehicle approaches a target zone when changing lanes from the third lane to the second lane.

(10): A control method according to an aspect of the present invention includes acquiring a speed of another vehicle and a position of the other vehicle; selecting a determination scheme according to the speed of the other vehicle from among a plurality of determination schemes; applying the position of the other vehicle to the selected determination scheme to determine whether the other vehicle enters a second lane adjacent to a first lane in which the other vehicle travels from the first lane; and controlling the vehicle based on a result of the determination.

(11): A storage medium according to an aspect of the present invention has a program stored therein, the program causing to: acquire a speed of another vehicle and a position of the other vehicle, select a determination scheme according to the speed of the other vehicle from among a plurality of determination schemes, apply the position of the other vehicle to the selected determination scheme to determine whether the other vehicle enters a second lane adjacent to a first lane in which the other vehicle travels from the first lane, and control the vehicle based on a result of the determination.

According to (1) to (11), it is possible to control a vehicle so that the vehicle performs a more appropriate action according to a surrounding situation by accurately determining or estimating an intended action of the vehicle.

DETAILED DESCRIPTION

Hereinafter, embodiments of the vehicle control device, vehicle control method, and storage medium of the present invention will be described with reference to the drawings. As used throughout this disclosure, the singular forms "a," "an," and "the" include plural reference unless the context clearly dictates otherwise.

[Overall Configuration]

Figure 1:
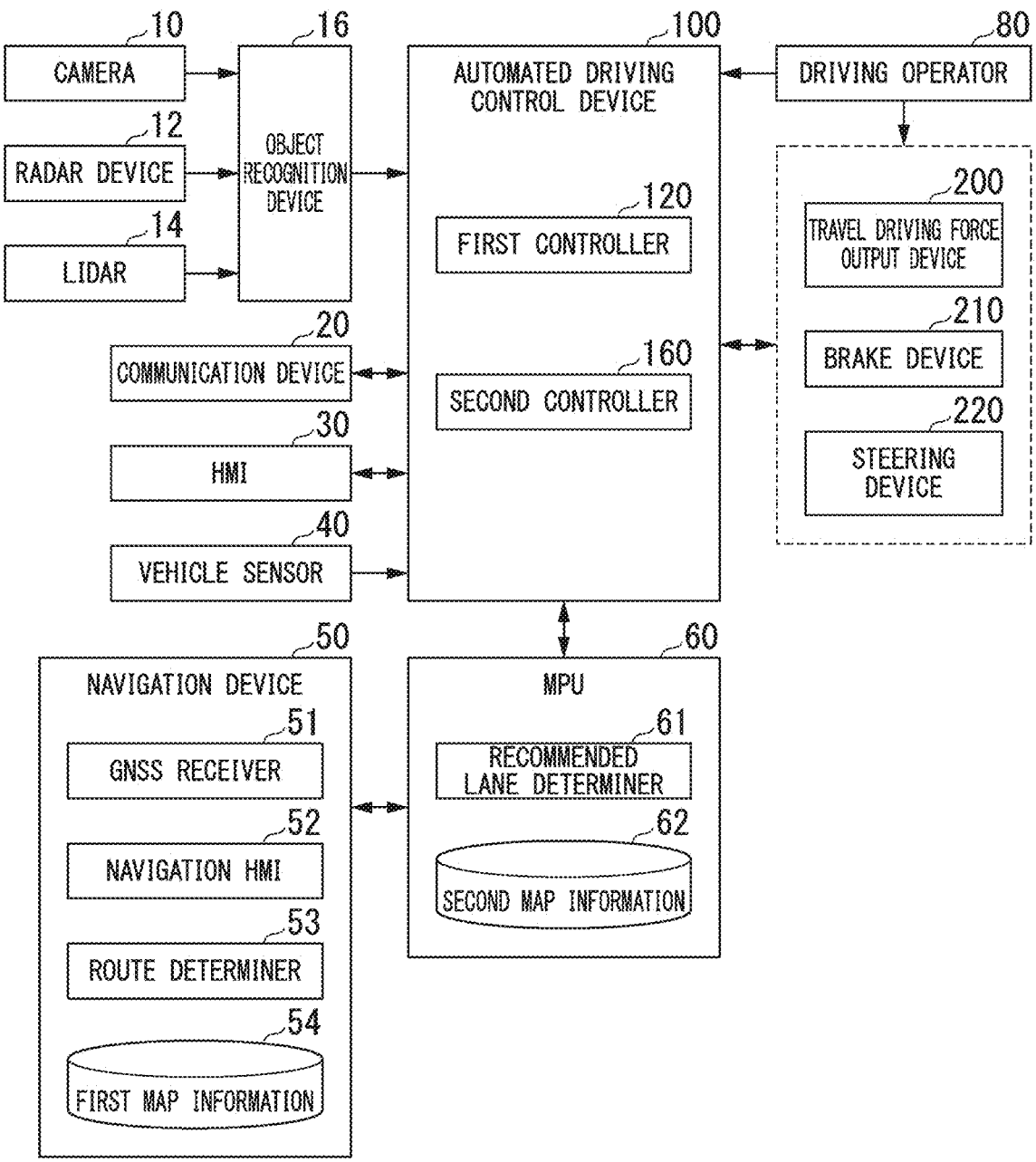
FIG. 1 is a configuration diagram of a vehicle system using a vehicle control device according to an embodiment.

FIG. 1 is a configuration diagram of a vehicle system 1 using a vehicle control device according to an embodiment. A vehicle on which the vehicle system 1 is mounted is, for example, a vehicle such as a two-wheeled vehicle, a three-wheeled vehicle, or a four-wheeled vehicle. A driving source thereof includes an internal combustion engine such as a diesel engine or a gasoline engine, an electric motor, or a combination thereof. The electric motor operates using power generated by a power generator connected to the internal combustion engine or discharge power of a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration shown in FIG. 1 is merely an example, and a part of the configuration may be omitted or other constituents may be added thereto.

The camera 10 is, for example, a digital camera using a solid-state imaging device such as a charge coupled device (CCD) or a complementary metal oxide semiconductor (CMOS). The camera 10 is attached to any location on the vehicle (hereinafter, the host vehicle M) in which the vehicle system 1 is mounted. In the case of forward imaging, the camera 10 is attached to, for example, an upper portion of a front windshield, a rear surface of a rearview mirror, or the like. The camera 10, for example, periodically and repeatedly images surroundings of the host vehicle M. The camera 10 may be a stereo camera.

The radar device 12 radiates radio waves such as millimeter waves to the surroundings of the host vehicle M and detects radio waves (reflected waves) reflected by the object to detect at least a position (a distance and direction) of the object. The radar device 12 is attached to any location on the host vehicle M. The radar device 12 may detect a position and a speed of the object using a frequency modulated continuous wave (FM-CW) scheme.

The LIDAR 14 irradiates the surroundings of the host vehicle M with light (or an electromagnetic wave having a wavelength close to that of light) and measures scattered light. The LIDAR 14 detects a distance to a target based on a time from light emission to light reception. The light to be radiated is, for example, pulsed laser light. The LIDAR 14 is attached to any location on the host vehicle M.

The object recognition device 16 performs sensor fusion processing on detection results of some or all of the camera 10, the radar device 12, and the LIDAR 14 to recognize a position, type, speed, and the like of the object. The object recognition device 16 outputs recognition results to the automated driving control device 100. The object recognition device 16 may output the detection results of the camera 10, the radar device 12, and the LIDAR 14 as they are to the automated driving control device 100. The object recognition device 16 may be omitted from the vehicle system 1.

The communication device 20, for example, communicates with another vehicle present around the host vehicle M using a cellular network, a Wi-Fi network, Bluetooth (registered trademark), dedicated short range communication (DSRC), or the like or communicates with various server devices via a wireless base station.

The HMI 30 presents various types of information to the occupant of the host vehicle M and receives an input operation from the occupant. The HMI 30 includes various display devices, speakers, buzzers, touch panels, switches, keys, and the like.

The vehicle sensor 40 includes, for example, a vehicle speed sensor that detects a speed of the host vehicle M, an acceleration sensor that detects an acceleration, a yaw rate sensor that detects an angular speed around a vertical axis, and a direction sensor that detects a direction of the host vehicle M.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies a position of the host vehicle M based on a signal received from GNSS satellites. The position of the host vehicle M may be specified or corrected by an inertial navigation system (INS) using an output of the vehicle sensor 40. The navigation HMI 52 includes a display device, a speaker, a touch panel, keys, and the like. The navigation HMI 52 may be partly or wholly shared with the HMI 30 described above. The route determiner 53, for example, determines a route (hereinafter, an on-map route) from the position of the host vehicle M specified by the GNSS receiver 51 (or any input position) to a destination input by the occupant using the navigation HMI 52 by referring to the first map information 54. The first map information 54 is, for example, information in which a road shape is represented by links indicating roads and nodes connected by the links. The first map information 54 may include a curvature of the road, point of interest (POI) information, and the like. The on-map route is output to the MPU 60. The navigation device 50 may perform route guidance using the navigation HMI 52 based on the on-map route. The navigation device 50 may be realized, for example, by a function of a terminal device such as a smartphone or a tablet terminal possessed by the occupant. The navigation device 50 may transmit a current position and a destination to a navigation server via the communication device 20 and acquire the same route as the on-map route from the navigation server.

The MPU 60 includes, for example, a recommended lane determiner 61 and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle), and determines a recommended lane for each block by referring to the second map information 62. The recommended lane determiner 61 determines in which lane from the left the host vehicle M travels. The recommended lane determiner 61 determines the recommended lane so that the host vehicle M can travel on a reasonable route for travel to a branch destination when there is a branch location in the on-map route.

The second map information 62 is map information with higher accuracy than the first map information 54. The second map information 62 includes, for example, information on a center of the lane or information on a boundary of the lane. The second map information 62 may include road information, traffic regulation information, address information (an address and postal code), facility information, telephone number information, and the like. The second map information 62 may be updated at any time by the communication device 20 communicating with another device.

The driving operator 80 includes, for example, an accelerator pedal, a brake pedal, a shift lever, a steering wheel, a deformed steer, a joystick, and other operators. A sensor that detects an amount of operation or the presence or absence of the operation is attached to the driving operator 80, and a result of the detection is output to the automated driving control device 100 or some or all of the travel driving force output device 200, the brake device 210, and the steering device 220.

The automated driving control device 100 includes, for example, a first controller 120 and a second controller 160. The first controller 120 and the second controller 160 are realized, for example, by a hardware processor such as a central processing unit (CPU) executing a program (software). Further, some or all of these components may be realized by hardware (circuit; including circuitry) such as a large scale integration (LSI), an application specific integrated circuit (ASIC), a field-programmable gate array (FPGA), or a graphics processing unit (GPU), or may be realized by software and hardware in cooperation. The program may be stored in a storage device (a storage device including a non-transitory storage medium) such as an HDD or a flash memory of the automated driving control device 100 in advance or may be stored in a detachable storage medium such as a DVD or a CD-ROM and installed in the HDD or flash memory of the automated driving control device 100 by the storage medium (a non-transitory storage medium) being mounted in a drive device. The automated driving control device 100 is an example of a "control device".

Figure 2:
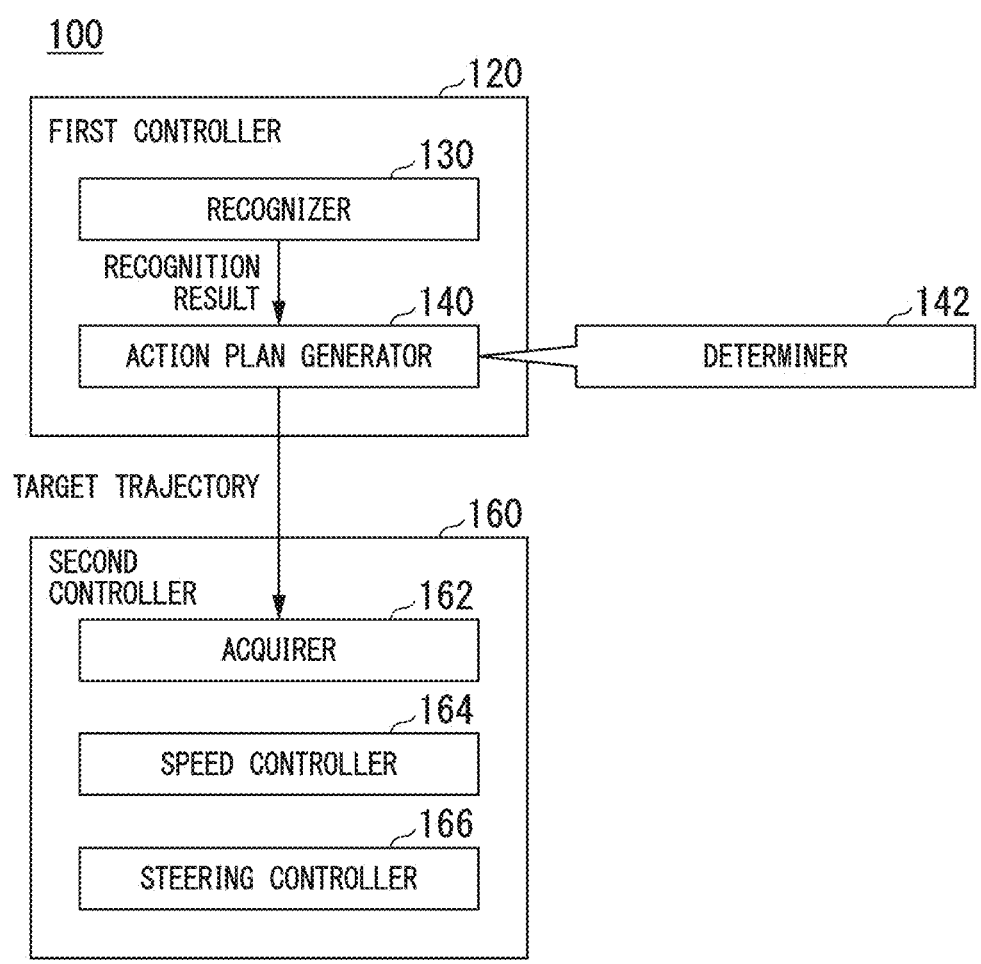
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. The first controller 120 realizes, for example, a function using artificial intelligence (AI) and a function using a previously given model in parallel. For example, a function of "recognizing an intersection" may be realized by recognition of the intersection using deep learning or the like and recognition based on previously given conditions (there is a signal which can be subjected to pattern matching, a road sign, or the like) being executed in parallel and scored for comprehensive evaluation. Accordingly, the reliability of automated driving is ensured.

The recognizer 130 recognizes a status such as a position, speed, and acceleration of an object present around the host vehicle M based on information input from the camera 10, the radar device 12, and the LIDAR 14 via the object recognition device 16. The position of the object, for example, is recognized as a position at absolute coordinates with a representative point (a centroid, a drive shaft center, or the like) of the host vehicle M as an origin and is used for control. The position of the object may be represented by a representative point such as a centroid or a corner of the object or may be represented by an expressed area. The "status" of the object may include an acceleration or jerk of the object, or an "action status" (for example, whether or not the object is changing lanes or is about to change lanes).

The recognizer 130, for example, recognizes a lane (a traveling lane) in which the host vehicle M is traveling. For example, the recognizer 130 compares a pattern of road demarcation lines (for example, an arrangement of solid lines and broken lines) obtained from the second map information 62 with a pattern of road demarcation lines around the host vehicle M recognized from an image captured by the camera 10 to recognize the traveling lane. The recognizer 130 may recognize not only the road demarcation lines but also a traveling road boundary (a road boundary) including road demarcation lines, a road shoulder, a curb, a median strip, a guard rail, or the like to recognize the traveling lane. In this recognition, the position of the host vehicle M acquired from the navigation device 50 or a processing result of an INS may be additionally considered. The recognizer 130 recognizes a temporary stop line, an obstacle, a red signal, a toll gate, and other road events.

The recognizer 130 recognizes a position or posture of the host vehicle M with respect to the traveling lane when recognizing the traveling lane. The recognizer 130 may recognize, for example, a deviation of a reference point of the host vehicle M from a center of the lane and an angle formed between a traveling direction of the host vehicle M and a line connecting along the center of the lane as a relative position and posture of the host vehicle M with respect to the traveling lane. Instead, the recognizer 130 may recognize, for example, a position of the reference point of the host vehicle M with respect to any one of side end portions (the road demarcation line or the road boundary) of the traveling lane as the relative position of the host vehicle M with respect to the traveling lane. The recognizer 130 is an example of an "acquirer".

In principle, the action plan generator 140 generates a target trajectory along which the host vehicle M will travel in the future automatically (without depending on an operation of a driver) so that the host vehicle M can travel on the recommended lane determined by the recommended lane determiner 61 and respond to a surroundings situation of the host vehicle M. The target trajectory includes, for example, a speed element. For example, the target trajectory is represented as a sequence of points (trajectory points) to be reached by the host vehicle M. The trajectory point is a point that the host vehicle M is to reach for each predetermined traveling distance (for example, several meters) along a road, and a target speed and a target acceleration at every predetermined sampling time (for example, every several tenths of a [sec]) are separately generated as a part of the target trajectory. The trajectory point may be a position that the host vehicle M is to reach at the sampling time at every predetermined sampling time. In this case, information on the target speed or the target acceleration is represented by an interval between the trajectory points.

When the action plan generator 140 generates the target trajectory, the action plan generator 140 may set an event of automated driving. Examples of the automated driving event include a constant speed traveling event, a low speed following driving event, a lane changing event, a branching event, a merging event, and a takeover event. The action plan generator 140 generates a target trajectory according to an activated event. The action plan generator 140 includes a determiner 142. Details of the determiner 142 will be described later.

The second controller 160 controls the travel driving force output device 200, the brake device 210, and the steering device 220 so that the host vehicle M passes through the target trajectory generated by the action plan generator 140 at a scheduled time.

Returning to FIG. 2, the second controller 160 includes, for example, an acquirer 162, a speed controller 164, and a steering controller 166. The acquirer 162 acquires information on the target trajectory (trajectory points) generated by the action plan generator 140 and stores the information on the target trajectory in a memory (not shown). The speed controller 164 controls the travel driving force output device 200 or the brake device 210 based on the speed element incidental to the target trajectory stored in the memory. The steering controller 166 controls the steering device 220 according to a bent state of the target trajectory stored in the memory. Processing of the speed controller 164 and the steering controller 166 is realized by, for example, a combination of feedforward control and feedback control. For example, the steering controller 166 executes a combination of feedforward control according to a curvature of a road in front of the host vehicle M and feedback control based on a deviation from the target trajectory.

The travel driving force output device 200 outputs a travel driving force (torque) for traveling of the vehicle to driving wheels. The travel driving force output device 200 includes, for example, a combination of an internal combustion engine, an electric motor, a transmission, and the like, and an electronic control unit (ECU) that controls these. The ECU controls the above configuration according to information input from the second controller 160 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to information input from the second controller 160 or information input from the driving operator 80 so that a brake torque according to a braking operation is output to each wheel. The brake device 210 may include a mechanism that transfers the hydraulic pressure generated by an operation of the brake pedal included in the driving operator 80 to the cylinder via a master cylinder, as a backup. The brake device 210 is not limited to the configuration described above and may be an electronically controlled hydraulic brake device that controls an actuator according to information input from the second controller 160 and transfers the hydraulic pressure of the master cylinder to the cylinder.

The steering device 220 includes, for example, a steering ECU and an electric motor. The electric motor, for example, changes directions of steerable wheels by causing a force to act on a rack and pinion mechanism. The steering ECU drives the electric motor according to the information input from the second controller 160 or the information input from the driving operator 80 to change the directions of the steerable wheels.

[Determination and Control Regarding Merging]

The determiner 142 changes a determination scheme (a determination rule, a determination logic, and a determination criterion) for determining whether or not the other vehicle merges into the target lane according to the speed of the other vehicle or the host vehicle M (or the speeds of both). For example, when the speed of the other vehicle or the host vehicle M (or the speeds of both) is lower than a first speed (for example, is a low speed), a first determination scheme is adopted, and when the speed of the other vehicle or the host vehicle M (or the speeds of both) exceeds a second speed (for example, is a high speed), a second determination scheme is adopted. The first speed and the second speed may be the same or may be different speeds.

(First Determination Scheme)

Figure 3:
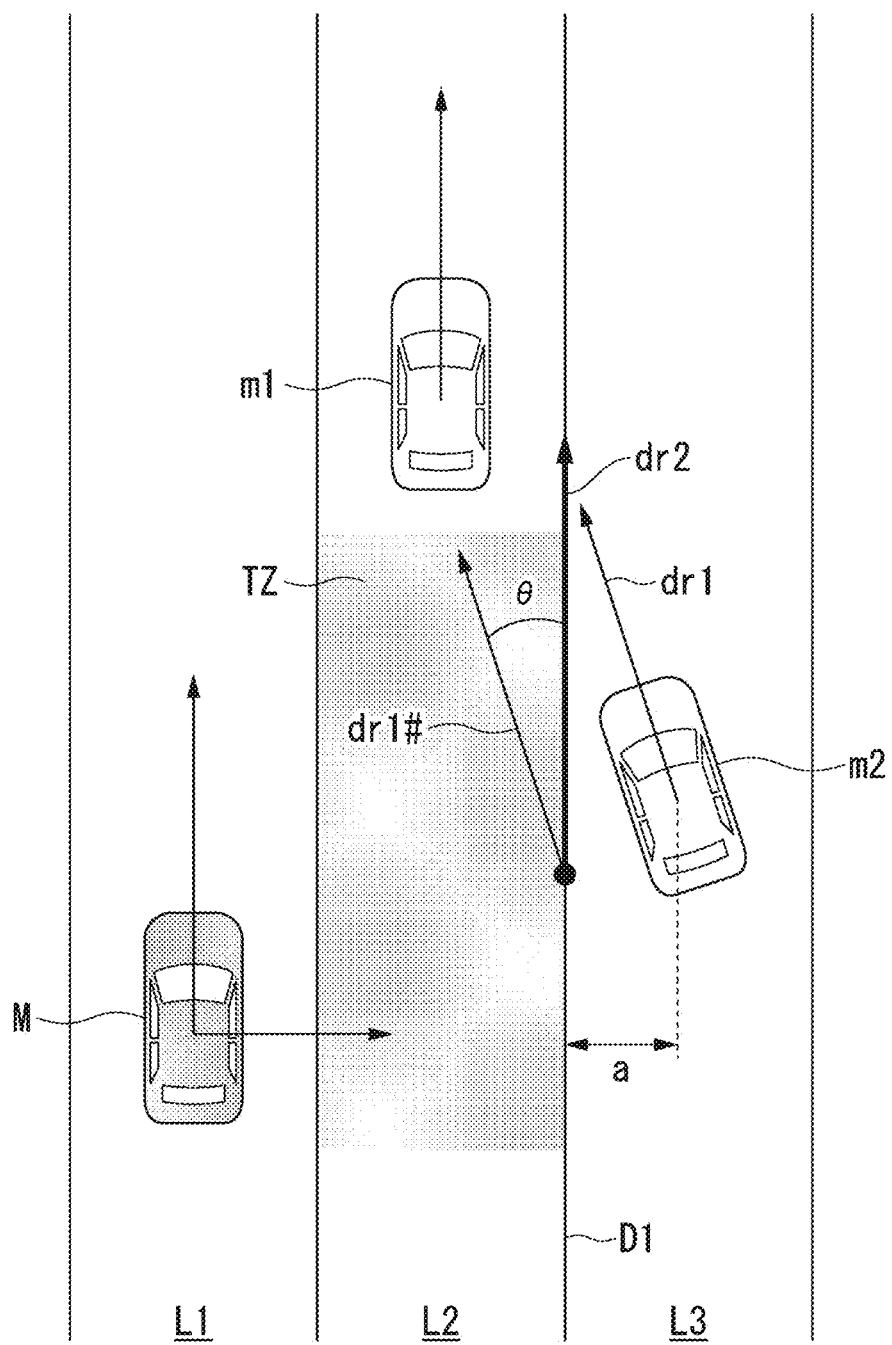
FIG. 3 is a diagram (part 1) for explaining a first determination scheme.

Hereinafter, a first determination scheme will be described. FIG. 3 is a diagram (part 1) for explaining the first determination scheme. The host vehicle M, another vehicle m1, and yet another vehicle m2 are traveling in the same direction on a road having lanes L1, L2, and L3. The host vehicle M is present in the lane L1, and the other vehicle m1 is present in front of the host vehicle M and in the lane L2. The other vehicle m2 is present in front of the host vehicle M, behind the other vehicle m1, and in the lane L3. A target zone TZ is a target zone TZ that the host vehicle M will enter. The target zone TZ is set, for example, in a region behind the host vehicle M. The target zone TZ is set, for example, behind of the host vehicle M or in a region in which there are no other vehicles likely to interfere with the host vehicle M behind or in front of the host vehicle M when the host vehicle M changes lanes.

The first determination scheme is a scheme for determining that the other vehicle m2 enters the lane L2 when (condition A), (condition B), and (condition C) are satisfied.

(Condition A) is that an angle θ formed by a direction dr1 corresponding to a direction of the other vehicle m2 and a direction dr2 of a road demarcation line D1 is equal to or greater than a threshold Th1. The direction dr1 of the other vehicle is, for example, a direction of a central axis of the other vehicle m2. A direction dr1 # in FIG. 3 is obtained by shifting the direction dr1 toward the lane L2. The direction dr2 of the road demarcation line is, for example, a direction of a road demarcation line close to the host vehicle M among the road demarcation lines D1 that demarcate the lane L3 on which the other vehicle m2 travels. (Condition A) is an example of "the direction of the other vehicle with respect to the second lane as a determination criterion."

(Condition B) is that a distance a (centroid distance a) between a reference position of the other vehicle m2 and the road demarcation line D1 is equal to or smaller than a threshold Th2. The reference position of the other vehicle m2 is, for example, the centroid of the other vehicle or any position.

(Condition B) is an example of "a distance from the centroid of the other vehicle to the road demarcation line for demarcating the first lane and the second lane as a determination criterion."

(Condition C) is that a state in which (condition A) and (condition B) are satisfied has passed a threshold Th3 or more. (Condition C) is an example of "a state in which the direction of the other vehicle with respect to the second lane satisfies the criterion, and the distance from the centroid of the other vehicle to the road demarcation line for demarcating the first lane and the second lane satisfies the criterion lasts a first time."

Figure 4:
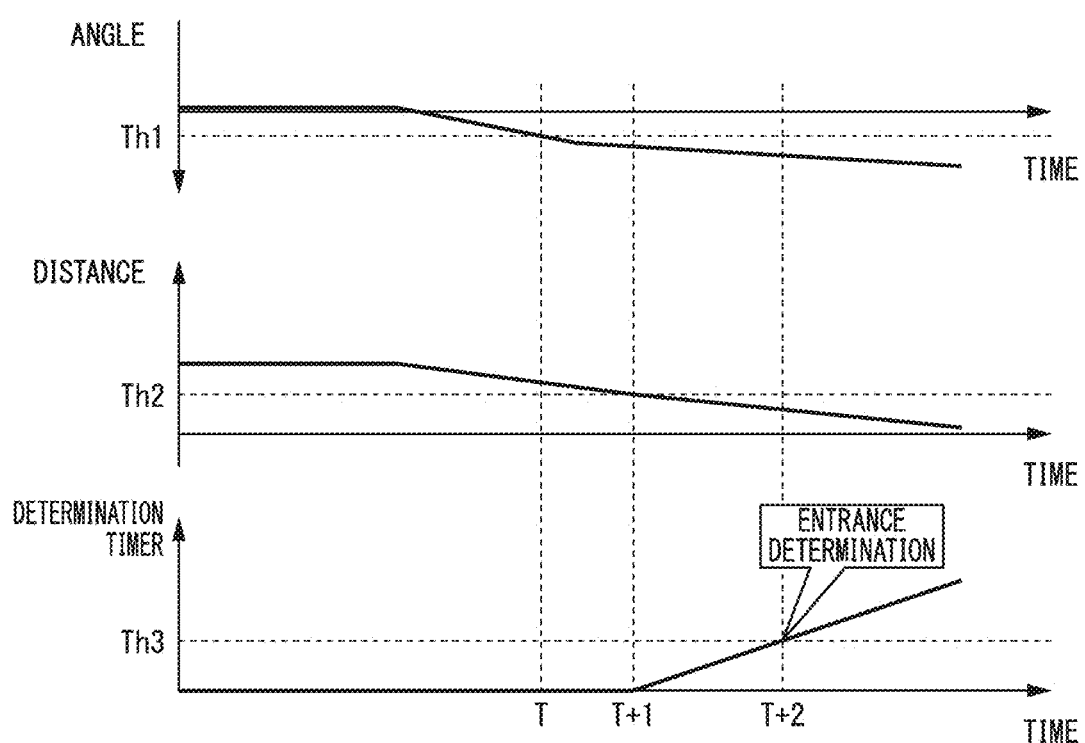
FIG. 4 is a diagram (part 2) for explaining the first determination scheme.

FIG. 4 is a diagram (part 2) for explaining the first determination scheme. As shown in FIG. 4, when the angle θ becomes equal to or greater than the threshold Th1 at time T and the distance a becomes equal to or smaller than the threshold Th2 at time T+1, the determiner 142 starts count of time when (condition 1) and (condition 2) are satisfied. At time T+2, when a predetermined time has passed since time T+1, the determiner 142 determines that (condition 1), (condition 2), and (condition 3) are satisfied, and determines that the other vehicle m2 enters the lane L2.

As described above, the determiner 142 uses (condition A), (condition B) and (condition C) to determine whether the other vehicle m2 has entered the lane L2.

(Second Determination Scheme)

Figure 5:
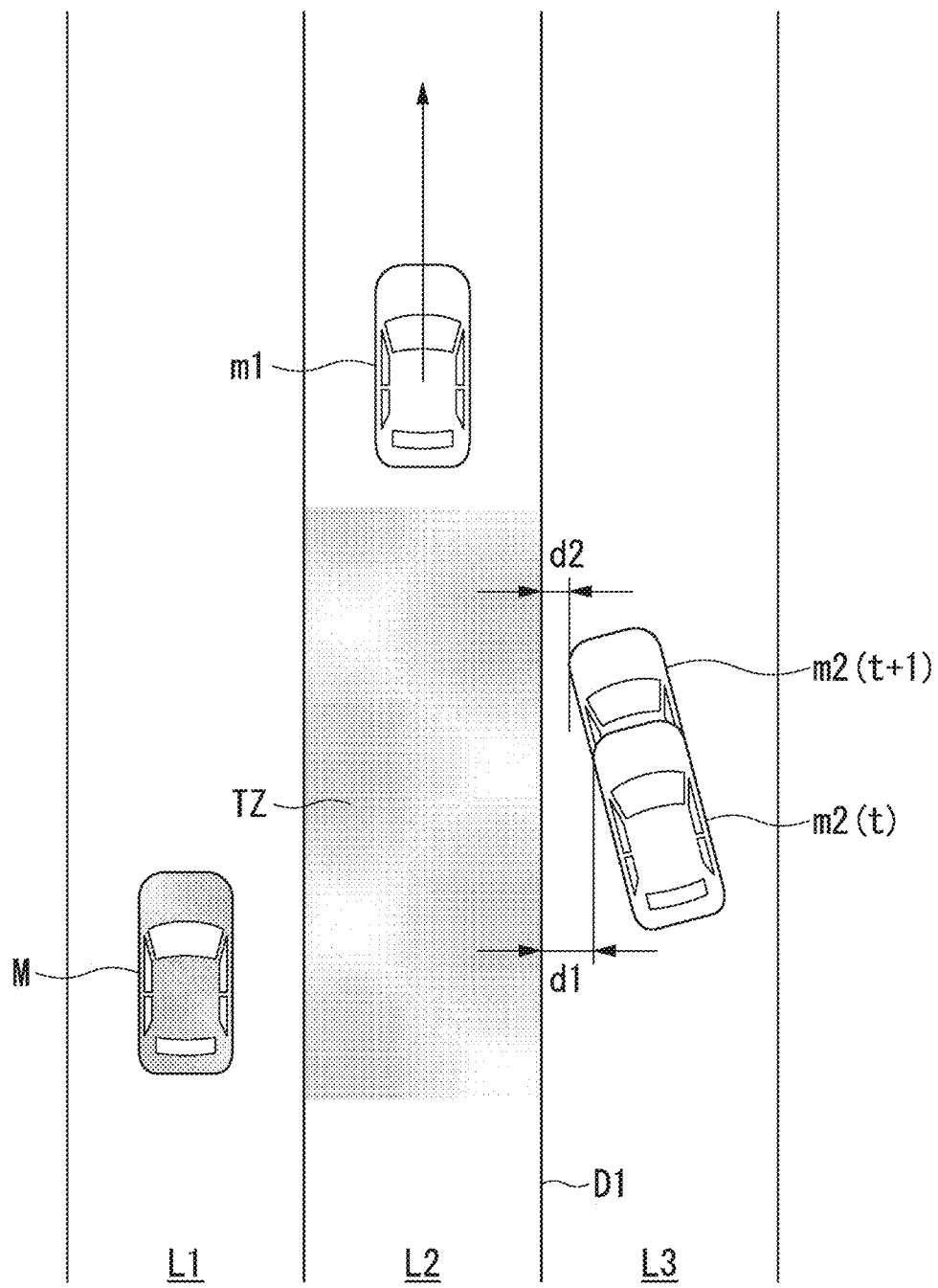
FIG. 5 is a diagram (part 1) for explaining a second determination scheme.

Hereinafter, a second determination scheme will be described. FIG. 5 is a diagram (part 1) for explaining the second determination scheme. The description will focus on differences from FIG. 3.

The second determination scheme is a scheme for determining that the other vehicle m2 enters the lane L2 when (condition a) and (condition b) are satisfied. (Condition a) or (condition b) is an example of "a distance from the end point of the other vehicle to the road demarcation line for demarcating the first lane and the second lane as a determination criterion." (Condition a) and (condition b) are examples of "the tendency of change in the distance from the end point of the other vehicle to the road demarcation line in a predetermined period of time becoming shorter with the tendency being equal to or greater than a threshold, and the distance being equal to or smaller than a threshold."

(Condition a) is that the tendency of change in an amount of lateral movement of the other vehicle m2 in a predetermined period of time becomes shorter with the tendency being equal to or greater than a threshold. The determiner 142 acquires a distance (an end point distance) between the road demarcation line D1 and a reference point of the other vehicle m2 and time-series change in distance in a predetermined period of time. The reference point of the other vehicle m2 is, for example, an end point of the other vehicle m2. For example, when the other vehicle m2 is about to enter a left lane, the end point is a left front position of the other vehicle m2. For example, when the other vehicle m2 is about to enter a right lane, the end point is a right front position of the other vehicle m2. The end point may be a rear end point (for example, a left rear end portion) rather than the front side. For example, the determiner 142 acquires an end point distance d1 at time t and an end point distance d2 at time t+1. The tendency of change in the amount of lateral movement will be described later with reference to FIG. 6.

(Condition b) is that the distance between the road demarcation line D1 and the reference point of the other vehicle m2 is equal to or smaller than a threshold Th4. In other words, the determiner 142 determines that (condition b) is satisfied when the end point of the other vehicle m2 approaches the road demarcation line D1.

Figure 6:
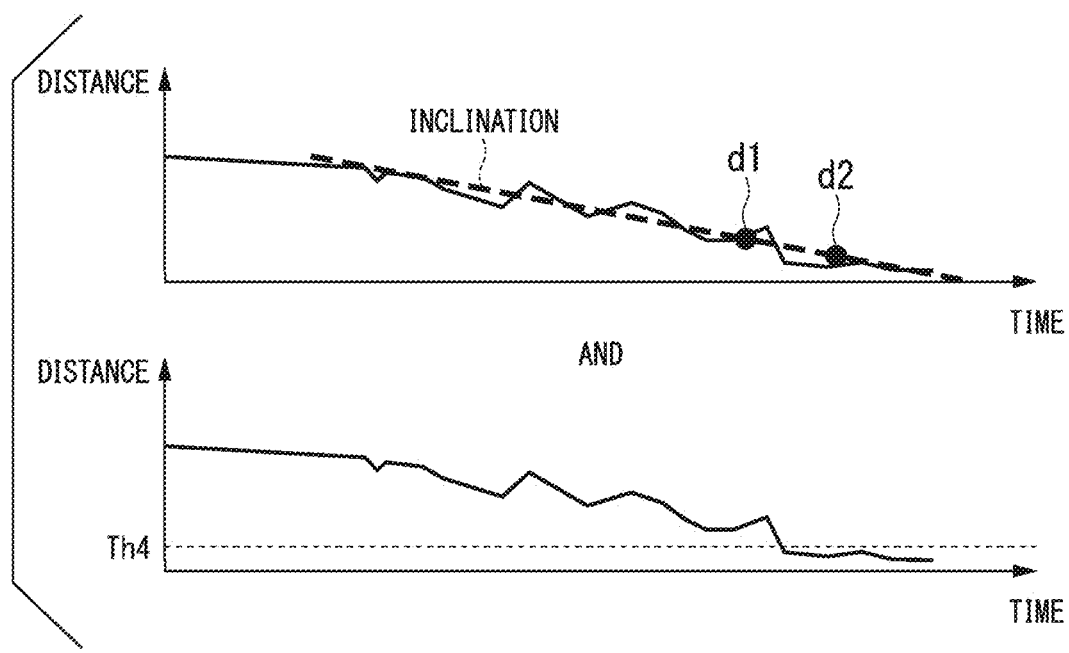
FIG. 6 is a diagram (part 2) for explaining the second determination scheme.

FIG. 6 is a diagram (part 2) for explaining the second determination scheme. As shown in an upper diagram of FIG. 6, an end point distance between the road demarcation line D1 and the end point of the other vehicle m2 is plotted for each time, and the plotted points are approximated to a straight line using a predetermined scheme such as a least squares method. When this straight line shows a tendency to approach the road demarcation line D1 and an inclination of the straight line is equal to or greater than a predetermined inclination, the determiner 142 determines that (condition a) is satisfied. The straight line is an example of the tendency of change in the amount of lateral movement. A curve or a reference indicating another tendency may be used to indicate the tendency of change in the amount of lateral movement instead of a straight line. As shown in a lower diagram of FIG. 6, when the end point distance between the road demarcation line D1 and the end point of the other vehicle m2 is equal to or smaller than the threshold Th4, the determiner 142 determines that (condition b) is satisfied.

As described above, the determiner 142 uses (condition a) and (condition b) to determine whether the other vehicle m2 has entered the lane L2.

For example, when the determiner 142 determines that the other vehicle m2 enters the lane L2 using the first determination scheme or the second determination scheme, the action plan generator 140 stops causing the host vehicle M to enter the lane L2. For example, the action plan generator 140 controls the host vehicle M so that the host vehicle M stays in the lane L1, or controls the host vehicle M so that the host vehicle M does not travel to the lane L2 side with respect to the current position of the host vehicle M. In this case, the action plan generator 140 may set the target zone TZ behind the other vehicle m2 and cause the host vehicle M to enter the target zone TZ.

[Flowchart]

Figure 7:
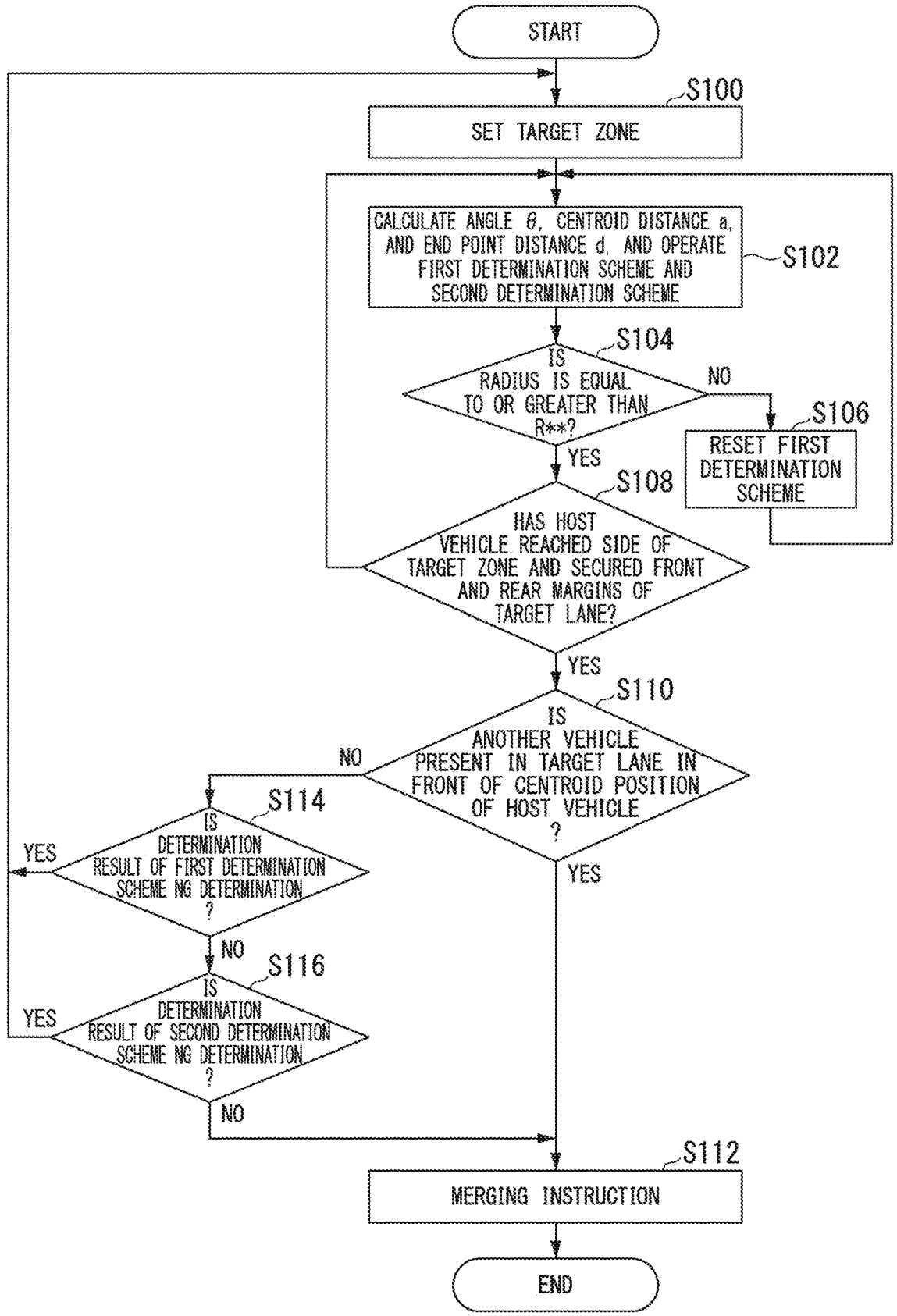
FIG. 7 is a flowchart showing an example of a flow of processing executed by an automated driving control device.

FIG. 7 is a flowchart showing an example of a flow of processing executed by the automated driving control device 100. First, the action plan generator 140 sets the target zone (step S100). Next, the action plan generator 140 calculates the angle θ, the centroid distance a, and the end point distance d and operates the first determination scheme and the second determination scheme (step S102).

Next, the action plan generator 140 determines whether or not a radius of the road is equal to or greater than R (step S104). In other words, the action plan generator 140 determines whether or not the road is a substantially straight road (a road with a radius equal to or greater than a predetermined radius). The road is a road on which the host vehicle M and the other vehicle travel, and specifically, a road corresponding to the target zone. When the radius of the road is not equal to or greater than R (when the road is the curved road to a predetermined degree or more), the action plan generator 140 resets processing of the first determination scheme (step S106). Accordingly, count-up related to condition C described above is reset.

When the radius of the road is equal to or greater than R** (for example, when the road is not a curved road to a predetermined degree or more, but a substantially straight road or a straight road), the action plan generator 140 determines whether the host vehicle M has reached the side of the target zone and secured front and rear margins of the target lane (the lane L2) (step S108). When the host vehicle M has not reached the side of the target zone or not secured the front and rear margins of the target lane, the processing returns to step S102. The secured front and rear margins of the target lane (the lane L2) are margins required for the host vehicle M to change lanes to the target lane.

When the host vehicle M has reached the side of the target zone and secured the front and rear margins of the target lane, the action plan generator 140 determines whether or not another vehicle (a vehicle that is about to enter the lane L2 from the lane L3) is present in the target lane in front of a centroid position of the host vehicle M (step S110). In other words, the determination in step S110 is made when the host vehicle M approaches the target zone. In the processing of step S110, another position of the host vehicle M may be referred to instead of the centroid position. The centroid position or the other position of the host vehicle M are examples of the "reference position." When there is another vehicle, the action plan generator 140 issues a merging instruction to the host vehicle M to cause the host vehicle M to change the lane behind the other vehicle (step S112). Since the lane change of the other vehicle has already been completed or is about to be completed, the host vehicle M changes the lane behind the other vehicle without considering determination results of the first determination scheme and the second determination scheme.

When there is no other vehicle in the target lane in step S110, the action plan generator 140 determines whether a determination result of the first determination scheme is an NG determination (a determination that the lane cannot be changed) (step S114). An NG determination as the determination result of the first determination scheme means, for example, that the speed of the other vehicle is equal to or lower than the first speed and the other vehicle satisfies (condition A) to (condition C).

When the determination result of the first determination scheme is an NG determination, the action plan generator 140 returns to the processing of step S100. In processing of step S114, when the determination result of the first determination scheme is not the NG determination, the action plan generator 140 determines whether or not the determination result of the second determination scheme is an NG determination (lane change impossibility determination) (step S116). The NG determination as the determination result of the second determination scheme means, for example, that the speed of the other vehicle exceeds the second speed and the other vehicle satisfies (condition a) and (condition b). When the determination result of the second determination scheme is an NG determination, the action plan generator 140 returns to processing of step S100.

When the determination result of the second determination scheme is not the NG determination, the action plan generator 140 issues a merging instruction to the host vehicle M and causes the host vehicle M to change lanes to the target lane (step S112). Thus, processing of one routine in the present flowchart ends.

As described above, the automated driving control device 100 controls the host vehicle M on the basis of a determination result in which the first determination scheme or the second determination scheme has been used. This makes it possible for the host vehicle M to smoothly change lanes in consideration of a surrounding situation.

Here, for example, when the host vehicle M tries to change lanes to the target lane, another vehicle may try to enter the target lane from a lane adjacent to the target lane (the lane L3 different from the lane in which the host vehicle M travels). In this case, it may be difficult to determine merging, or the determination may be delayed. For example, a state of a direction indicator can be obtained by recognizing an image, but when the direction indicator is not turned on, it may not be possible to detect the entrance of the other vehicle.

Therefore, in the present embodiment, the determiner 142 determines whether or not the other vehicle enters the target lane using the direction of the other vehicle and change in the direction with respect to the road demarcation line. This makes it possible for the determiner 142 to accurately determine that the other vehicle is entering the target lane. For example, even when the other vehicle does not turn on the direction indicator or when it is difficult for the host vehicle M to recognize the state of the direction indicator, the determiner 142 can determine whether the other vehicle enters the target lane with high accuracy. The host vehicle M can perform an action that takes a surrounding situation into account by performing an action using a result of the determination.

The first determination scheme and the second determination scheme are schemes for observing various parameters when a vehicle changes lanes at each speed, and using a parameter allowing accurate and easy estimation or determination of the vehicle entering the target lane among the observed parameters. Therefore, as described above, the automated driving control device 100 can easily and accurately determine whether or not the other vehicle enters the target lane by using the determination scheme according to the speed.

Modification Example 1

In the above-described example, it has been assumed that, when lane change is performed in automated driving, the action plan generator 140 determines whether or not the other vehicle enters the target lane on the basis of an action of the other vehicle and controls the host vehicle M on the basis of a determination result. In modification example 1, the same determination is performed and control according to a determination result is realized when an auto lane change function is turned on by the driver instead of automated driving.

Figure 8:
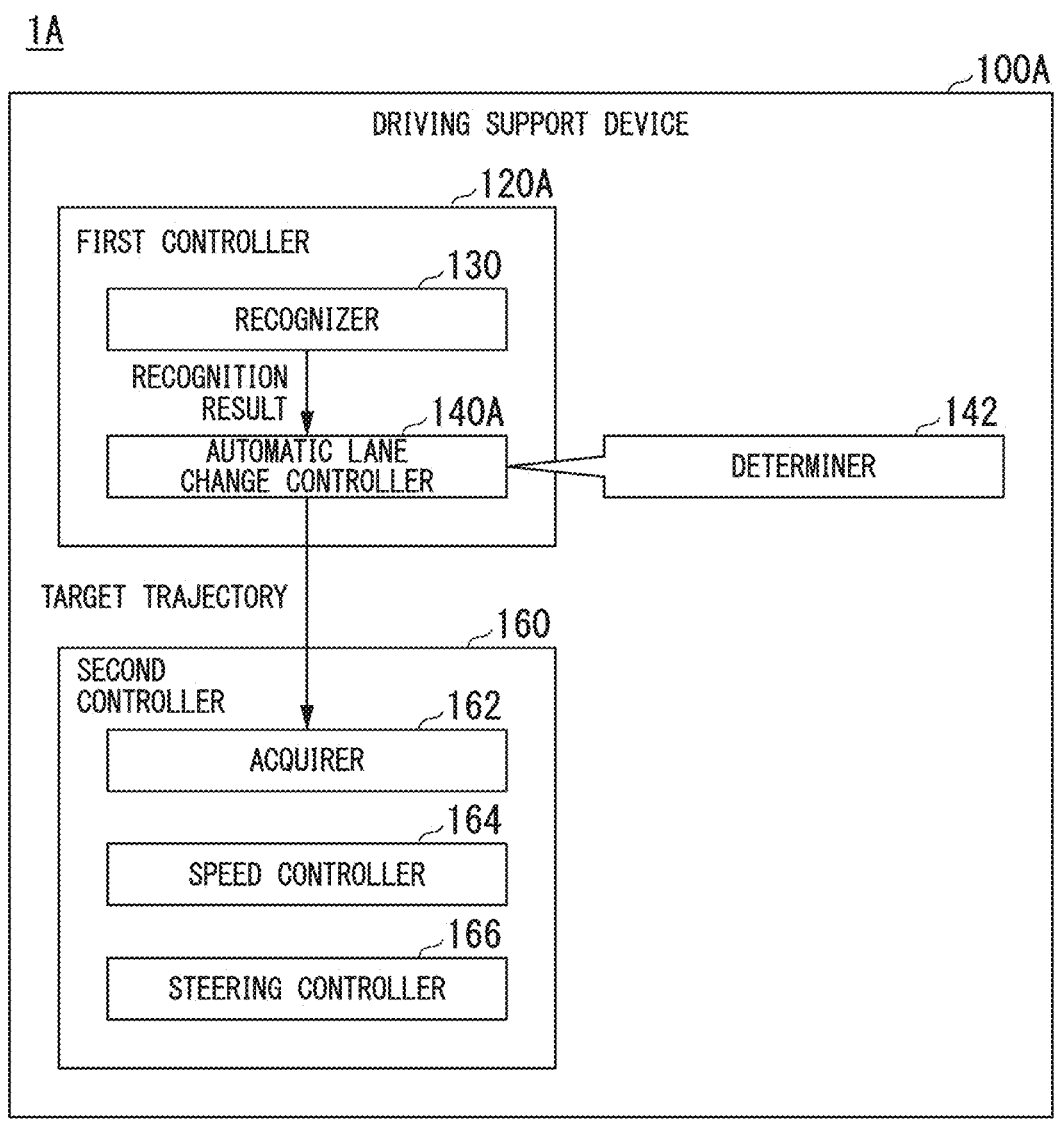
FIG. 8 is a diagram showing an example of a functional configuration of a vehicle system in modification example 1

FIG. 8 is a diagram showing an example of a functional configuration of the vehicle system 1A of modification example 1. The vehicle system 1A includes a driving support device 100A in place of (or in addition to) the automated driving control device 100 of the vehicle system 1. The driving support device 100A includes, for example, a first controller 120A and a second controller 160. The first controller 120A includes, for example, a recognizer 130, and an automatic lane change controller 140A. The automatic lane change controller 140A includes a determiner 142. The recognizer 130, the determiner 142, and the second controller 160 have the same functional configuration as the functional configuration with the same name and reference sign described above.

The automatic lane change controller 140A, for example, automatically changes lanes on the basis of an instruction of the driver without depending on an operation of the driver. Examples of the instruction of the driver includes operating a predetermined button or operating a lever of the direction indicator in a direction in which the driver desires to change lanes. The automatic lane change controller 140A, for example, performs the lane change on the condition that the host vehicle M does not interfere with other vehicles around the host vehicle M when the host vehicle M has performed an action for the lane change. The automatic lane change controller 140A suspends the lane change for a predetermined time when it is assumed that the host vehicle M interferes with the other vehicle around the host vehicle M and performs the lane change when the condition is satisfied after the suspension. In this case, the automatic lane change controller 140A determines whether to start the lane change, whether to stop the lane change after starting the lane change, and the like, on the basis of a determination result of the determiner 142. For example, when the determiner 142 determines that the other vehicle enters the target lane, the automatic lane change controller 140A suspends the start of the lane change or stops the lane change after starting the lane change.

As described above, the automatic lane change controller 140A can control the host vehicle M on the basis of the result of the determiner 142, to cause the host vehicle M to perform a more appropriate action according to the surrounding situation.

Modification Example 2

In modification example 2, the HMI 30 outputs information based on the determination result of the determiner 142 in manual operation. The output is an output through a sound or an image. The information based on the determination result is, for example, information indicating that there is a high risk of another vehicle entering the target lane, information indicating that another vehicle is about to enter the target lane, or the like. Providing the information as described above is an example of "controlling the vehicle on the basis of the determination result of the determiner."

Figure 9:
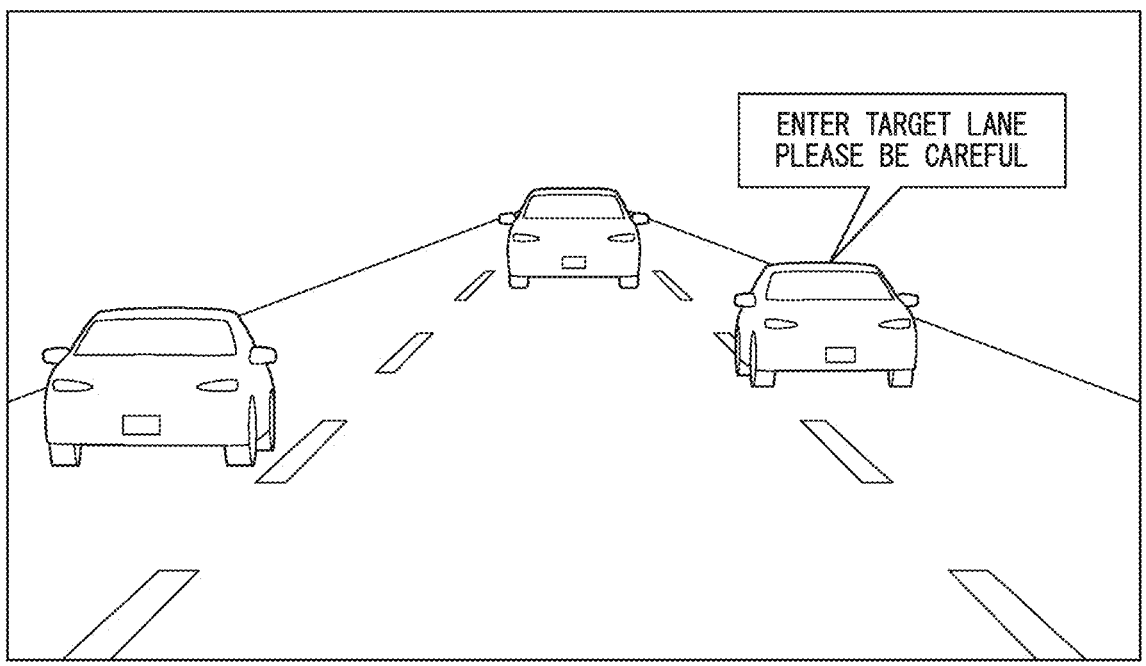
FIG. 9 is a diagram showing an example of an output image.

FIG. 9 is a diagram showing an example of the output image. For example, when the determiner 142 determines that the other vehicle enters the target lane, the automated driving control device 100 (the driving support device 100A or a control device mounted on the host vehicle M) causes an image to be displayed on the HMI 30 to warn the driver about the fact that the other vehicle enters the target lane. As described above, information on the other vehicle is provided to the driver to improve convenience for the driver.

Modification Example 3

In modification example 3, the state of the direction indicator of the other vehicle is considered. For example, the determiner 142 may include, in conditions of the first determination scheme or the second determination scheme, that the direction indicator indicates that the other vehicle enters the target lane.

When the direction indicator indicates that the other vehicle enters the target lane, the determiner 142 may mitigate conditions such as a threshold or a timer for the first determination scheme or the second determination scheme. The mitigation means adjusting the threshold so that the condition is easily satisfied.

As described above, the determiner 142 can more accurately determine or estimate an intended action of the vehicle by considering the state of the direction indicator.

<Others>

In the description of the above example, although the first determination scheme or the second determination scheme is used depending on the speed, a determination may be made that the other vehicle enters the target lane when both the conditions of the first determination scheme and the second determination scheme have been satisfied. In this case, a determination may be made that the other vehicle enters the target lane when the direction indicator indicates that the other vehicle enters the target lane. The first determination scheme or the second determination scheme may be used regardless of the speed. For example, the second determination scheme may be used when the speed is equal to or smaller than the threshold, and the first determination scheme may be used when the speed exceeds the threshold. A determination may be made that the other vehicle enters the target lane regardless of the speed when the condition of one of the first determination scheme and the second determination scheme has been satisfied.

A third determination scheme may be used in addition to the first determination scheme and the second determination scheme. For example, the first determination scheme may be used at low speed, the third determination scheme at medium speed, and the second determination scheme at high speed. The third determination scheme should completely match the conditions of the first determination scheme or the conditions of the second determination scheme. The third determination scheme may be, for example, to satisfy the conditions (A) to (C) of the first determination scheme and the conditions (a) and (b) of the second determination scheme, or to satisfy any one of the condition of the first determination scheme and the condition of the second determination scheme. In addition to the above, the third determination scheme may be to satisfy one or more of the conditions of the first determination scheme or the second determination scheme. The third determination scheme may be a determination scheme including a condition that the threshold of the condition of the first determination scheme or the second determination scheme has been changed.

According to the embodiment described above, the control device can accurately determine whether or not the other vehicle enters the second lane adjacent to the first lane from the first lane in which the other vehicle travels, thereby realizing vehicle control that takes the surrounding situation into account on the basis of a result of the determination.

The embodiment described above can be expressed as follows.

A control device including
a storage device that stores a program, and
a hardware processor, and being configured to:
acquire a speed of another vehicle and a position of the other vehicle,
select a determination scheme according to the speed of the other vehicle from among a plurality of determination schemes,
apply the position of the other vehicle to the selected determination scheme to determine whether the other vehicle enters a second lane adjacent to a first lane in which the other vehicle travels from the first lane, and
control the vehicle based on a result of the determination, by the hardware processor executing the program stored in the storage device.

While forms for carrying out the present invention have been described using the embodiments, the present invention is not limited to these embodiments at all, and various modifications and substitutions can be made without departing from the gist of the present invention.

What is claimed is:

1. A control device, wherein one or more processors:
acquire a speed of an other vehicle and a position of the other vehicle,
select, from a plurality of determination schemes, a determination scheme based on the speed of the other vehicle, wherein the plurality of determination schemes represent rules for determining whether or not the other vehicle is merging into a second lane based on the speed of the other vehicle,
based on the position of the other vehicle and the determination scheme, determine a result associated with whether the other vehicle has entered the second lane that is adjacent to a first lane in which the other vehicle is currently traveling,
control a host vehicle based on the result,
select a first determination scheme from among the plurality of determination schemes when the speed of the other vehicle is lower than a threshold, and
select a second determination scheme from among the plurality of determination schemes when the speed of the other vehicle is equal to or higher than the threshold, wherein
the first determination scheme includes a direction of the other vehicle with respect to the second lane as a determination criterion, and
the second determination scheme does not include the direction of the other vehicle with respect to the second lane as a determination criterion.

2. A control device, wherein one or more processors:
acquire a speed of an other vehicle and a position of the other vehicle,
select, from a plurality of determination schemes, a determination scheme based on the speed of the other vehicle, wherein the plurality of determination schemes represent rules for determining whether or not the other vehicle is merging into a second lane based on the speed of the other vehicle,
based on the position of the other vehicle and the determination scheme, determine a result associated with whether the other vehicle has entered the second lane that is adjacent to a first lane in which the other vehicle is currently traveling,
control a host vehicle based on the result,
select a first determination scheme from among the plurality of determination schemes when the speed of the other vehicle is lower than a threshold, and
select a second determination scheme from among the plurality of determination schemes when the speed of the other vehicle is equal to or higher than the threshold, wherein
the first determination scheme includes a distance from a centroid of the other vehicle to a road demarcation line for demarcating the first lane and the second lane as a determination criterion, and
the second determination scheme does not include the distance from the centroid of the other vehicle to the road demarcation line for demarcating the first lane and the second lane as the determination criterion.

3. The control device according to claim 1,
wherein the one or more processors determine that the other vehicle changes lanes to the second lane when a state in which the direction of the other vehicle with respect to the second lane satisfies a criterion, and a distance from a centroid of the other vehicle to a road demarcation line for demarcating the first lane and the second lane satisfies a criterion lasts a first time, in the first determination scheme, and
suppress a lane change of the host vehicle to the second lane.

4. A control device, wherein one or more processors:
acquire a speed of an other vehicle and a position of the other vehicle,
select, from a plurality of determination schemes, a determination scheme based on the speed of the other vehicle, wherein the plurality of determination schemes represent rules for determining whether or not the other vehicle is merging into a second lane based on the speed of the other vehicle,
based on the position of the other vehicle and the determination scheme, determine a result associated with whether the other vehicle has entered the second lane that is adjacent to a first lane in which the other vehicle is currently traveling,
control a host vehicle based on the result,
select a first determination scheme from among the plurality of determination schemes when the speed of the other vehicle is lower than a threshold, and
select a second determination scheme from among the plurality of determination schemes when the speed of the other vehicle is equal to or higher than the threshold, wherein
the first determination scheme does not include a distance from an end point of the other vehicle to a road demarcation line for demarcating the first lane and the second lane as a determination criterion, and
the second determination scheme includes the distance from the end point of the other vehicle to the road demarcation line as a determination criterion.

5. The control device according to claim 4, wherein the one or more processors
determine, in the second determination scheme, that the other vehicle changes lanes to the second lane when the tendency of change in the distance from the end point of the other vehicle to the road demarcation line in a predetermined period of time becomes shorter with the tendency being equal to or greater than a threshold, and the distance is equal to or smaller than a threshold, and
suppress a lane change of the host vehicle to the second lane.

6. A control device, wherein one or more processors:
acquire a speed of an other vehicle and a position of the other vehicle,
select, from a plurality of determination schemes, a determination scheme based on the speed of the other vehicle, wherein the plurality of determination schemes represent rules for determining whether or not the other vehicle is merging into a second lane based on the speed of the other vehicle,
based on the position of the other vehicle and the determination scheme, determine a result associated with whether the other vehicle has entered the second lane that is adjacent to a first lane in which the other vehicle is currently traveling,
control a host vehicle based on the result,
select a first determination scheme from among the plurality of determination schemes when the speed of the other vehicle is lower than a threshold, and
select a second determination scheme from among the plurality of determination schemes when the speed of the other vehicle is equal to or higher than the threshold, wherein
the first determination scheme includes a direction of the other vehicle with respect to the second lane and a distance from a centroid of the other vehicle to a road demarcation line for demarcating the first lane and the second lane as determination criteria, and does not include a distance from an end point of the other vehicle to the road demarcation line as a determination criterion, and
the second determination scheme includes the distance from the end point of the other vehicle to the road demarcation line as a determination criterion, and does not include the direction of the other vehicle with respect to the second lane and the distance from the centroid of the other vehicle to the road demarcation line for demarcating the first lane and the second lane as determination criteria.

7. The control device according to claim 1, wherein the one or more processors
determine whether or not the other vehicle enters the second lane using the determination scheme according to the speed of the other vehicle when a road corresponding to the first lane and the second lane is not a curved road to a predetermined degree or more, and
does not determine whether or not the other vehicle enters the second lane using a determination scheme according to the speed of the other vehicle when a road corresponding to the first lane and the second lane is a curved road to a predetermined degree or more.

8. The control device according to claim 1, wherein the one or more processors cause the host vehicle to change lanes to the second lane behind the other vehicle without considering a determination result of the determination scheme according to the speed of the other vehicle in a case in which the other vehicle is entering the second lane in front of a reference position of the host vehicle when the host vehicle is present in a third lane adjacent to the first lane and adjacent to the second lane, and the host vehicle approaches a target zone when changing lanes from the third lane to the second lane, wherein the third lane is a lane this is between the first lane and the second lane.

9. A control method comprising:
acquiring, by a computer, a speed of an other vehicle and a position of the other vehicle;
selecting, by the computer, from a plurality of determination schemes, a determination scheme based on the speed of the other vehicle, wherein the plurality of determination schemes represent rules for determining whether or not the other vehicle is merging into a second lane based on the speed of the other vehicle;
based on the position of the other vehicle and the determination scheme, determining, by the computer, a result associated with whether the other vehicle has entered the second lane that is adjacent to a first lane in which the other vehicle is currently traveling;
controlling, by the computer, a host vehicle based on a result of the determination;
selecting, by the computer, a first determination scheme from among the plurality of determination schemes when the speed of the other vehicle is lower than a threshold, and
selecting, by the computer, a second determination scheme from among the plurality of determination schemes when the speed of the other vehicle is equal to or higher than the threshold, wherein
the first determination scheme includes a direction of the other vehicle with respect to the second lane as a determination criterion, and
the second determination scheme does not include the direction of the other vehicle with respect to the second lane as the determination criterion.

10. A non-transitory computer storage medium having a program stored therein, the program causing a computer to:
acquire a speed of an other vehicle and a position of the other vehicle,
select, from a plurality of determination schemes, a determination scheme based on the speed of the other vehicle, wherein the plurality of determination schemes represent rules for determining whether or not the other vehicle is merging into a second lane based on the speed of the other vehicle,
based on the position of the other vehicle and the determination scheme, determine a result associated with whether the other vehicle has entered the second lane that is adjacent to a first lane in which the other vehicle is currently traveling,
control the host vehicle based on a result of the determination,
select a first determination scheme from among the plurality of determination schemes when the speed of the other vehicle is lower than a threshold, and
select a second determination scheme from among the plurality of determination schemes when the speed of the other vehicle is equal to or higher than the threshold, wherein
the first demarcation scheme includes a direction of the other vehicle with respect to the second lane as a determination criterion, and
the second demarcation scheme does not include the direction of the other vehicle with respect to the second lane as the determination criterion.

11. The control device according to claim 2,
wherein the one or more processors determine that the other vehicle changes lanes to the second lane when a state in which the direction of the other vehicle with respect to the second lane satisfies a first criterion, and the distance from a centroid of the other vehicle to a road demarcation line for demarcating the first lane and the second lane satisfies a second criterion that lasts a defined period of time, in the first determination scheme, and suppresses a lane change of the host vehicle to the second lane.

* * * * *